United States Patent
Tardieu et al.

(10) Patent No.: US 12,028,272 B2
(45) Date of Patent: Jul. 2, 2024

(54) PRE-ALLOCATION OF CLOUD RESOURCES THROUGH ANTICIPATION

(71) Applicant: International Business Machines Corporation, Armonk, NY (US)

(72) Inventors: Victor Tardieu, Montpellier (FR); Ivan Deleuze, Montpellier (FR); Gael Ayouba, Montpellier (FR); Anthony Morales, Baillargues (FR)

(73) Assignee: International Business Machines Corporation, Armonk, NY (US)

( * ) Notice: Subject to any disclaimer, the term of this patent is extended or adjusted under 35 U.S.C. 154(b) by 47 days.

(21) Appl. No.: 17/485,602

(22) Filed: Sep. 27, 2021

(65) Prior Publication Data

US 2023/0097508 A1    Mar. 30, 2023

(51) Int. Cl.
| | |
|---|---|
| *G06F 15/173* | (2006.01) |
| *G06N 3/04* | (2023.01) |
| *H04L 47/70* | (2022.01) |
| *H04L 47/762* | (2022.01) |
| *H04L 47/78* | (2022.01) |
| *H04L 47/80* | (2022.01) |
| *H04L 67/50* | (2022.01) |

(52) U.S. Cl.
CPC ............ *H04L 47/823* (2013.01); *G06N 3/04* (2013.01); *H04L 47/762* (2013.01); *H04L 47/781* (2013.01); *H04L 47/808* (2013.01); *H04L 67/535* (2022.05)

(58) Field of Classification Search
CPC ... H04L 47/762; H04L 47/781; H04L 47/823; H04L 67/535; G06N 3/04
See application file for complete search history.

(56) References Cited

U.S. PATENT DOCUMENTS

| | | |
|---|---|---|
| 8,612,615 B2 | 12/2013 | Ferris |
| 9,055,066 B2 | 6/2015 | Kim |
| 2013/0019015 A1 | 1/2013 | Devarakonda |
| 2014/0016575 A1 | 1/2014 | El Gamal |

(Continued)

OTHER PUBLICATIONS

"System and Method for Dynamically Increasing Computation Resources Available to a Mobile Device via Cloud Services", An IP.com Pr or Art Database Technical Disclosure, Authors et al.: Disclosed Anonymously, IP.com No. IPCOM000203280D, IP.com Electronic Publication Date: Jan. 21, 2011, 3 pages.

(Continued)

*Primary Examiner* — Yves Dalencourt
(74) *Attorney, Agent, or Firm* — Nicholas A. Welling (57) ABSTRACT

Providing users with smooth and reliable applications in a cloud based setting is a desirable goal. An approach to pre-allocating cloud computing resources may be provided to improve user experience. A user device may monitor an environment for individual user behaviors with visual and/or audio sensors. Based on data from the visual and/or audio sensors individual behaviors may be identified. Individual behaviors may be identified and associated with a cloud computing resource request. Computing resources in the cloud may be reserved or pre-allocated based on the cloud computing resource request. The pre-allocated computing resources can improve user experience through reduced wait time and improve initial cloud-based application response.

14 Claims, 5 Drawing Sheets

(56) References Cited

U.S. PATENT DOCUMENTS

| | | | | |
|---|---|---|---|---|
| 2014/0075005 | A1* | 3/2014 | Tung | H04L 41/5006 |
| | | | | 709/223 |
| 2017/0221370 | A1* | 8/2017 | Chander | G09B 19/0092 |
| 2019/0250949 | A1* | 8/2019 | Chen | H04L 43/062 |
| 2019/0364492 | A1* | 11/2019 | Azizi | H04W 48/10 |
| 2019/0366210 | A1* | 12/2019 | Beltran | A63F 13/335 |
| 2021/0256832 | A1* | 8/2021 | Weisz | G06V 40/168 |
| 2021/0397940 | A1* | 12/2021 | Schneider | G06N 3/049 |
| 2022/0057519 | A1* | 2/2022 | Goldstein | G01S 17/894 |

OTHER PUBLICATIONS

Cai et al., "A Cognitive Platform for Mobile Cloud Gaming", 2013 IEEE International Conference on Cloud Computing Technology and Science, DOI 10.1109/CloudCom.2013.17, pp. 72-79.

Chen et al., "A proactive resource allocation method based on adaptive prediction of resource requests in cloud computing", J Wireless Com Network (2021) 2021:24, <https://doi.org/10.1186/s13638-021-01912-8>, 20 pages.

Chen et al., "Deep Learning for Sensor-based Human Activity Recognition: Overview, Challenges and Opportunities", arXiv:2001.07416v2 [cs.HC] Jan. 22, 2021, J. ACM, vol. 37, No. 4, Article 111, Publication date: Aug. 2018, <https://doi.org/10.1145/1122445.1122456>, 40 pages.

Mell et al., "The NIST Definition of Cloud Computing", Recommendations of the National Institute of Standards and Technology, NIST Special Publication 800-145, Sep. 2011, 7 pages.

* cited by examiner

PRE-ALLOCATION OF CLOUD RESOURCES THROUGH ANTICIPATION

BACKGROUND OF THE INVENTION

The present invention relates generally to cloud computing, more specifically, to anticipating cloud usage and pre-allocating cloud resources.

Cloud computing provides users with access to powerful computing resources and databases. The increase in broadband and other networking technologies has allowed more users to access cloud computing resources, resulting in greater consumption and higher demand on the resources. Streaming services have particularly enjoyed huge popularity due to the on-demand nature of access to media. For cloud providers to provide a seamless enjoyable experience to users, the cloud must have the capacity to handle user access requests and the ability to share and balance the resources among users. Since not all users will utilize uniform or constant computing resources (e.g., CPU, GPU, memory) balancing the resources among users is an important process in media streaming.

Internet of things devices have provided a level of connection and efficiency unknown to previous generations. Webcams, sensors, and device controllers can detect routine activities of a user and even detect the identity of the user. This routine can be analyzed and used to generate a smart schedule in which normal everyday activities of a user will be expected at certain times, days, or associated with particular events.

SUMMARY

Embodiments of the present disclosure include a computer-implemented method, computer program product, and a system for pre-allocation of cloud computing resources. Embodiments may include receiving sensor data from at least one sensor. Further, embodiments may include identifying the sensor data is associated with a user behavior. Additionally, embodiments may include determining the user behavior is associated with a cloud computing resource request. Embodiments may also include allocating one or more cloud computing resources for the determined cloud computing resource request.

It should be understood, the above summary is not intended to describe each illustrated embodiment of every implementation of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

The embodiments depicted and described herein recognize the benefits of pre-allocating cloud computing resources by anticipating user actions. Users of cloud streaming services expect a quick loading time and applications that do not lag or freeze during operation. Pre-allocation of cloud computing resources can allow for quick loading of applications and prevent freezing or lagging of applications being utilized by users, due to unexpected balancing of CPU or GPU consumption.

In an embodiment of the present invention, a user device can continually send visual and audio sensor data to a cloud resource allocation engine. The cloud resource allocation engine can identify individual behavioral patterns of a user based on the visual sensor data. The cloud resource allocation engine can determine if an identified individual behavioral pattern is associated with a cloud computing resource request. If it is determined a behavioral pattern is identified that is associated with a cloud computing resource request, a resource allocation module can pre-allocate the cloud resources necessary to process the cloud computing resource request.

In an embodiment, cloud resource pre-allocation environment 100 may be configured to access various data sources, such as user audio and video data that may include personal data, content, contextual data, or information that a user does not want to be processed. Personal data includes personally identifying information or sensitive personal information as well as user information, such as location tracking or geolocation information. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal data. In an embodiment, cloud resource pre-allocation environment 100 enables the authorized and secure processing of personal data. In an embodiment, cloud resource pre-allocation environment 100 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. In an embodiment, cloud resource pre-allocation environment 100 provides information regarding personal data and the nature (e.g., type, scope, purpose, duration, etc.) of the processing. In an embodiment, cloud resource pre-allocation environment 100 provides a user with copies of stored personal data. In an embodiment, cloud resource pre-allocation environment 100 allows for the correction or completion of incorrect or incomplete personal data. In an embodiment, cloud resource pre-allocation environment 100 allows for the immediate deletion of personal data.

For example, in an embodiment, a video gaming console may have a visual sensor (e.g., webcam, build in camera, motion detector, infrared camera, etc.). The visual sensor may continuously monitor the immediate environment for activity and send the stream to a cloud resource allocation engine. If a user walks into the room and picks up a video game controller, the visual sensor, in this case a built in webcam, can send the stream to the resource allocation engine. The resource allocation engine can recognize the individual behavior of picking up the video gaming controller, based on known individual behaviors. In this instant case, the associated computing resource request is to load a video game the user has been playing frequently the past week. Resource pre-allocation module can pre-allocate the necessary computing resources to initialize the video game. The user continues with the process of logging into the video game service and the required resources are ready for the user.

As another example, in an embodiment, an adult user walks into a living room on a weekday morning and sits in their recliner. A built-in camera on a smart television ("TV") identifies the user and also that they are carrying a mug and picks up the smart TV remote control. Cloud resource pre-allocation engine receives the visual data stream from the smart TV and identifies the individual behavior based on previously observed behaviors of the individual. In this instance, the individual behavior is identified as associated with a cloud computing resource request to access a morning news stream. Behavior identification module bases this identification on the time of day (morning), day of the week (weekday), the individual (adult user), and individual factors (carrying a mug). Further, the action of sitting down and picking up the smart TV remote control also contribute to the association with the morning news stream. Based on the associated cloud computing resource request, resource allocation module can allocate the cloud computing resources necessary to complete the request. In this instance, the user can choose the application associated with the morning news stream and immediately after the user authorization process, the morning news stream is instantly on the smart TV screen, rather than waiting for the resources to be allocated and the service to initialize.

In yet another example, in an embodiment, the same smart TV as in the previous example identifies a child walks into the living room on a Saturday afternoon and lays on the floor and begins eating cookies. The smart TV can send a visual data steam of the child to cloud resource pre-allocation engine and based on previous individual behavioral examples, the behavior identification module can isolate the behavior and determine it is associated with a cloud resource allocation request for a cartoon streaming service. Behavior identification module bases this identification on the time of day (afternoon), day of the week (Saturday), the individual (child user), user's action (sitting on floor) and individual factors (eating cookies). Resource pre-allocation module can allocate the cloud computing resources necessary for initialization of the cartoon streaming service. In this case, the child does not turn on the smart TV and the non-utilized resources are timed out releasing the resources back to an unused resource pool. Resource pre-allocation module can have a time-out capability (one minute, 5 minutes, or dynamic based on network usage) in which it releases the cloud computing resources it allocated.

It should be noted, behavior identification module can have multiple user profiles associated with a user device. The smart TV in the previous two examples has a profile for the adult user and the child user. The profile can allow a user to enter information regarding the user and set preferences. Parental controls can be put in place for the child user by the adult user. Further, an adult user can further set timeframe for when a visual detection device (webcam, built in camera, etc.) may be able to monitor an environment and whether a child user can have a profile.

In another embodiment, behavior identification module can utilize a neural network to identify individual behaviors. For example, a convolutional neural network may analyze individual images from a web-cam stream. The convolutional neural network may be trained initially with an individual's profile, then through continuously monitoring and updating the network to identify individual behaviors. A second neural network may be utilized to predict cloud computing resource allocation requests based on individual behaviors and additional factors for example, time, day, location, user(s), and user emotion.

In an embodiment, a cloud resource request is predicted to occur if a determined degree of likelihood meets or exceeds a predetermined threshold level.

In describing embodiments in detail with reference to the figures, it should be noted that references in the specification to "an embodiment," "other embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, describing a particular feature, structure, or characteristic in connection with an embodiment, one skilled in the art has the knowledge to affect such feature, structure or characteristic in connection with other embodiments whether or not explicitly described.

Figure 1:
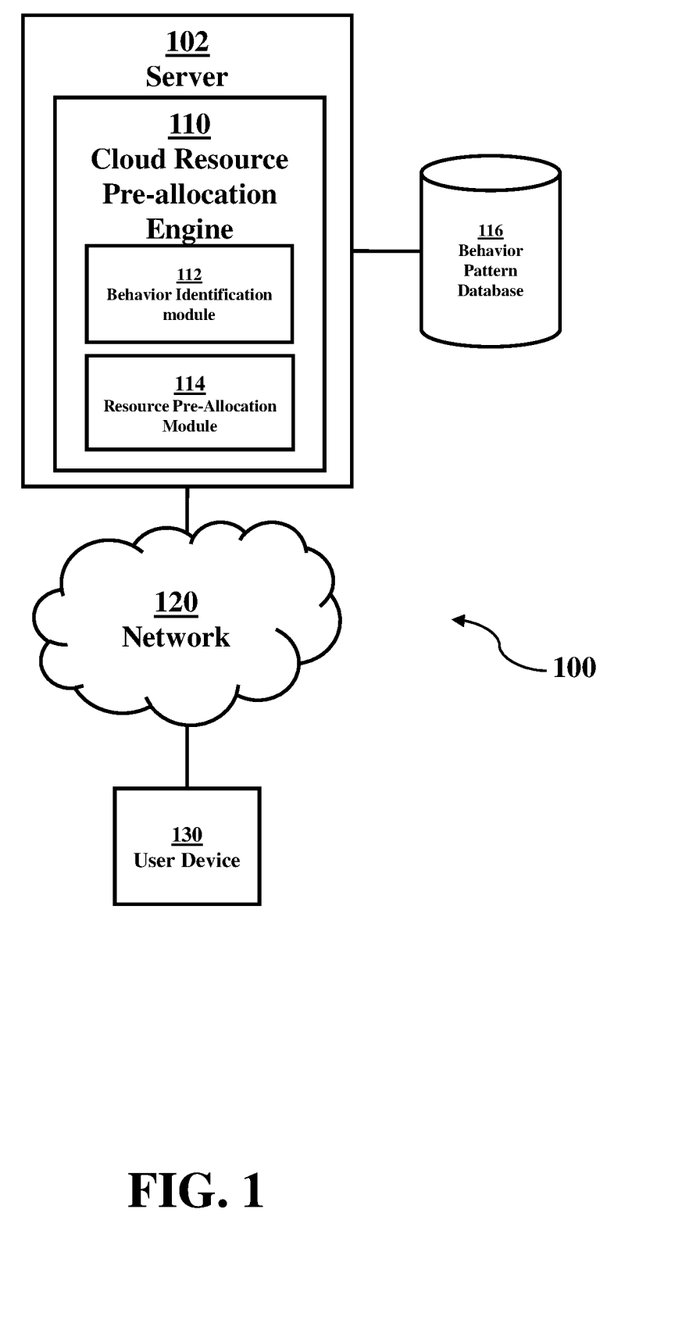
FIG. 1 is a functional block diagram generally depicting cloud resource pre-allocation environment 100, in accordance with an embodiment of the present invention.

FIG. 1 is a functional block diagram depicting, generally, cloud resource pre-allocation environment 100. Shown in cloud resource pre-allocation environment 100 is server 102, user device 130 and network 120. Also shown in FIG. 1 is cloud resource pre-allocation engine 110. Operational on cloud resource pre-allocation engine 110 is behavior identification module 112, and resource pre-allocation module 114. Stored on server 102 is behavior pattern database 116.

Server 102 can be a standalone computing device, a management server, a web server, a mobile computing device, or any other electronic device or computing system capable of receiving, sending, and processing data. In other embodiments, server 102 can represent a server computing system utilizing multiple computers as a server system. It should be noted, while one server and one client computer are shown in FIG. 1, cloud resource pre-allocation environment 100 can have any number of servers and client computers (e.g., 1, 2, n . . . n+1). In another embodiment, server 102 can be a laptop computer, a tablet computer, a netbook computer, a personal computer, a desktop computer, or any programmable electronic device capable of communicating with other computing devices (not shown) within video translation and cloud resource pre-allocation environment 100 via network 120.

In another embodiment, server 102 represents a computing system utilizing clustered computers and components (e.g., database server computers, application server computers, etc.) that can act as a single pool of seamless resources when accessed within cloud resource pre-allocation environment 100. Server 102 can include internal and external hardware components, as depicted, and described in further detail with respect to FIG. 3.

Operational on server 102 is cloud resource pre-allocation engine 110. Cloud resource pre-allocation engine 110 is a computer program that can be configured to receive a video stream from user device 130 and predict whether a user is about to access a cloud based resource and pre-allocate the cloud based resource. Cloud resource pre-allocation engine 110 can be comprised of behavior identification module 112 and resource pre-allocation module 114.

Behavior identification module 112 can be a computer module that can be configured to receive visual data from user device 130 and identify individual behaviors from the visual data. Further, behavior identification module 112 can determine if the individual behaviors are associated with a cloud based resource request. For example, behavior identification module 112 can receive a web-cam stream from user device 130. The data from the webcam stream can be analyzed via a neural network such as a convolutional neural network. The output of the neural network can predict whether an individual behavior is associated with a cloud computing resource request.

Behavior identification module 112 can be initialized from a user profile, which may include preferences and typical times in which a user might access certain cloud computing resources. After initialization, behavior identification module 112 can have machine learning capabilities which allow it to update a neural network or other artificial intelligence models through observation of user device 130 visual data and associating cloud computing resource requests with observed visual data. Further, behavior identification module 112 can be configured to identify emotions of a user which may be factored into identification of individual behaviors and associated cloud computing requests.

In an embodiment, behavioral identification module 112 can receive audio and visual data from user device 130 and utilize both sources of data to determine an individual behavior. For example, two teenage users, each with an associated profile on user device 130, run into a room in late afternoon on a Sunday and sit down on a couch. One user says, "turn on the football game!" Based on previous observations, behavioral identification module 112 identifies these users will likely tune into a preferred football team's game on a sport centric streaming application. The determination of an individual behavior by behavioral identification module 112 was based on the time, day, action and speech of the particular user.

Resource pre-allocation module 114 is a computer module that can reserve or pre-allocate cloud computing resources based on an identified behavior received by behavior identification module 112. For example, if behavior identification module 112 identifies an individual behavior associated with a cloud computing resource request, resource pre-allocation module 114 can reserve cloud computing resources necessary to initialize or run the predicted application.

In an embodiment, resource pre-allocation module 114 can have a time-out feature if resources that were pre-allocated are not utilized or if all of the pre-allocated resources were not utilized. For example, if an individual behavior associated with a cloud computing resource request is identified by behavior identification module 112 and resource pre-allocation module 114 pre-allocates the resources associated with the cloud computing resource request, but the cloud computing resource request does not occur, resource pre-allocation module 114 can release the reserved cloud computing resources after a certain time duration. The time duration can be static and pre-determined, or it can be dynamic, based on the current demands of the cloud platform (not shown).

Behavior pattern database 116 is a database that can contain user profile information, visual data, audio data, and metadata associated with the visual data and audio data. Behavior pattern database 116 can have data associated with identifying individual behavior and data to associate individual behaviors with cloud computing resource requests. It should be noted streaming data from user device 130 can be stored in behavior pattern database 116 for updating any artificial intelligence systems through the machine learning capabilities of any modules operational on cloud resource pre-allocation engine 110.

Network 120 can be, for example, a local area network (LAN), a wide area network (WAN) such as the Internet, or a combination of the two, and can include wired, wireless, or fiber optic connections. In general, network 120 can be any combination of connections and protocols that will support communications between server 102, and other computing devices within cloud resource pre-allocation environment 100.

User Device 130 can be a computing device capable of sending visual sensor data to server 102 via network 120. In an embodiment, user device 130 is a smart device with a web-camera or similar visual sensor that can stream video images to server 102. For example, user device 130 can be a smart TV or a video streaming device with a built-in camera that is connected to a cloud based video streaming service. The built-in camera can operate continuously or on a schedule set by a user. Further, a smart TV can be configured to pre-load applications or services.

In an embodiment, user device 130 can be a gaming console with a built-in or external camera with a microphone that streams video and audio data back to server 102. For example, user device 130 can monitor a room constantly or intermittently depending on a user profile setting or if the device is in power saving mode. User device 130 can be a gaming console which can stream video games from a cloud server. Additionally, a gaming console can have applications for streaming music, video steaming, web conferencing, or the like.

Figure 2:
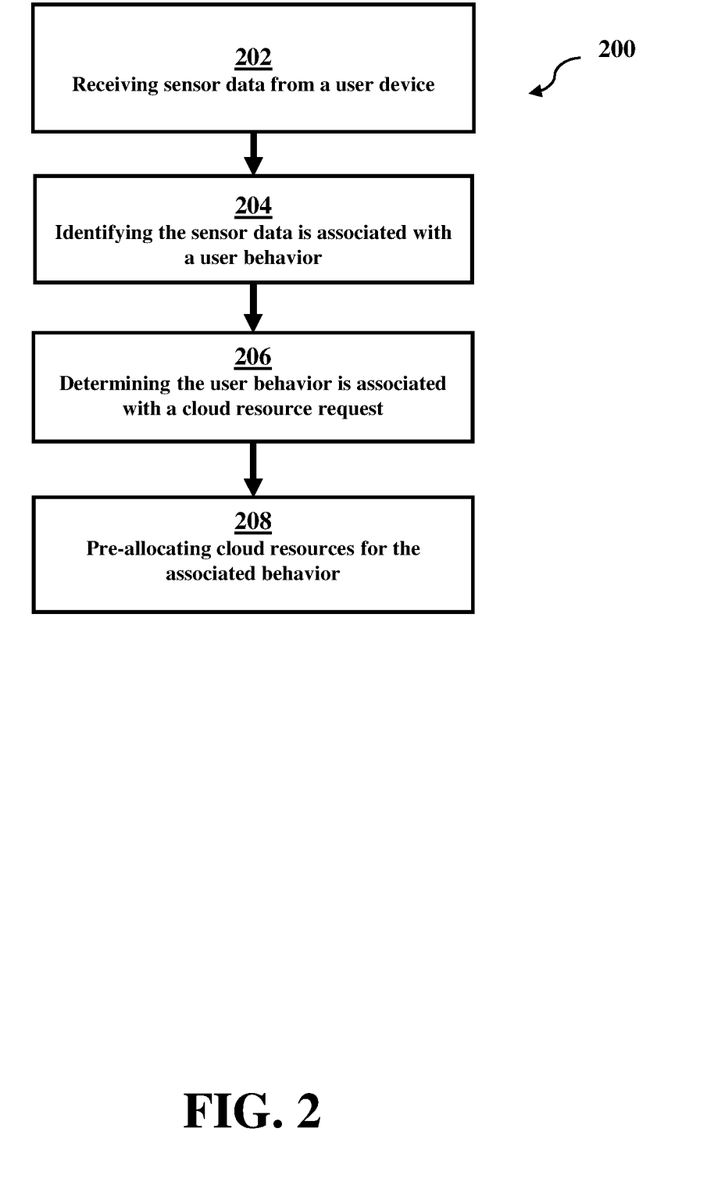
FIG. 2 is a flowchart depicting operational steps of a method for pre-allocating cloud computing resources based on observed user behavior, in accordance with an embodiment of the present invention.

FIG. 2 is a flowchart, generally designated 200, depicting operational steps of pre-allocating cloud resources based on user behavior. At step 202, cloud resource pre-allocation engine 110 receives sensor data from user device 130. At step 204, behavior identification module 112 identifies an individual behavior based on the sensor data. At step 206, behavior identification module 112 determines if the individual behavior is associated with a cloud computing resource request. At step 208, responsive to determining that the individual behavior is associated with the cloud computing resource request, resource pre-allocation module 114 reserves the cloud resources associated with the determined cloud computing resource request.

Figure 3:
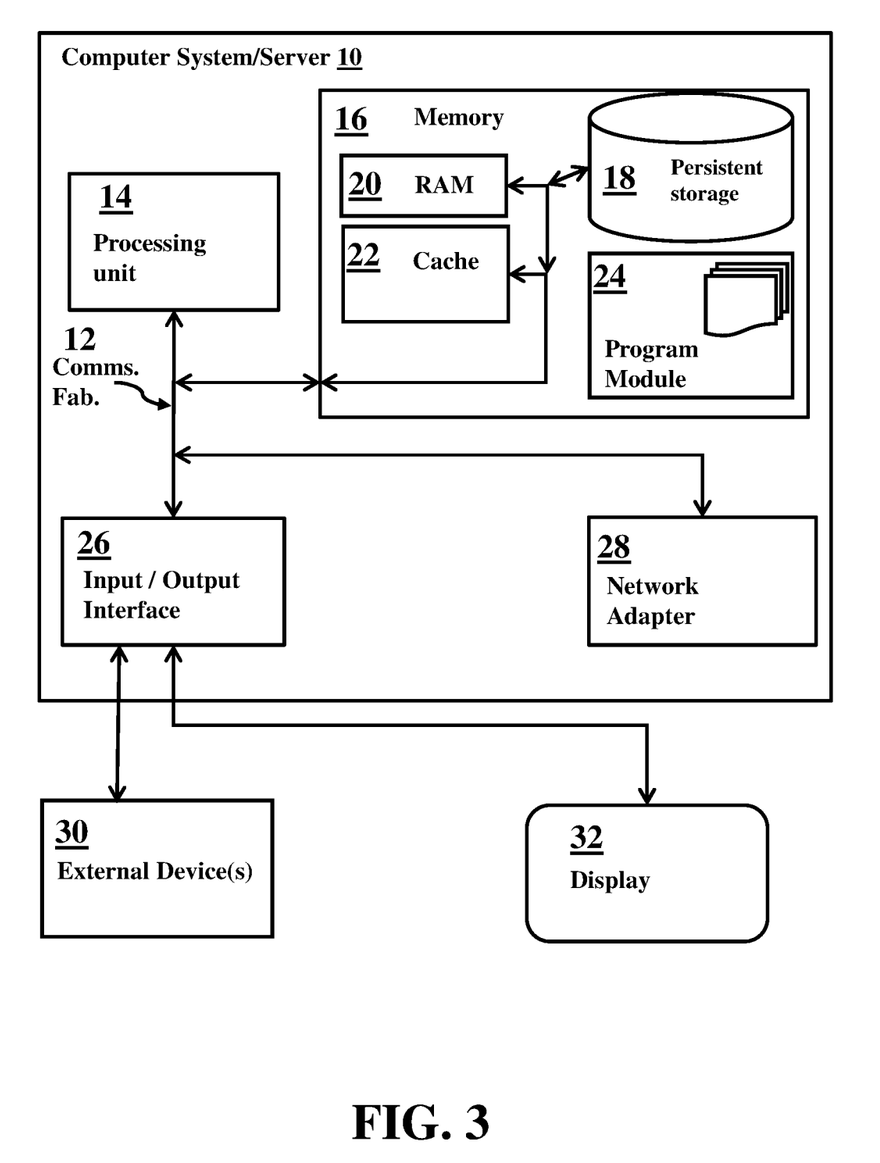
FIG. 3 is a functional block diagram of an exemplary computing system within cloud resource pre-allocation environment 100, in accordance with an embodiment of the present invention.

FIG. 3 depicts computer system 10, an example computer system representative of a dynamically switching user interface computer 10. Computer system 10 includes communications fabric 12, which provides communications between computer processor(s) 14, memory 16, persistent storage 18, network adaptor 28, and input/output (I/O) interface(s) 26. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses.

Computer system 10 includes processors 14, cache 22, memory 16, persistent storage 18, network adaptor 28, input/output (I/O) interface(s) 26 and communications fabric 12. Communications fabric 12 provides communications between cache 22, memory 16, persistent storage 18, network adaptor 28, and input/output (I/O) interface(s) 26. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses or a crossbar switch.

Memory 16 and persistent storage 18 are computer readable storage media. In this embodiment, memory 16 includes random access memory (RAM) 20. In general, memory 16 can include any suitable volatile or non-volatile computer readable storage media. Cache 22 is a fast memory that enhances the performance of processors 14 by holding recently accessed data from memory 16, nearby processors 14. As will be further depicted and described below, memory 16 may include at least one of program module 24 that is configured to carry out the functions of embodiments of the invention.

The program/utility, having at least one program module 24, may be stored in memory 16 by way of example, and not limiting, as well as an operating system, one or more application programs, other program modules, and program data. Each of the operating systems, one or more application programs, other program modules, and program data or some combination thereof, may include an implementation of a networking environment. Program module 24 generally carries out the functions and/or methodologies of embodiments of the invention, as described herein.

Program instructions and data used to practice embodiments of the present invention may be stored in persistent storage 18 and in memory 16 for execution by one or more of the respective processors 14 via cache 22. In an embodiment, persistent storage 18 includes a magnetic hard disk drive. Alternatively, or in addition to a magnetic hard disk drive, persistent storage 18 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 18 may also be removable. For example, a removable hard drive may be used for persistent storage 18. Other examples include optical and magnetic disks, thumb drives, and smart cards that are inserted into a drive for transfer onto another computer readable storage medium that is also part of persistent storage 18.

Network adaptor 28, in these examples, provides for communications with other data processing systems or devices. In these examples, network adaptor 28 includes one or more network interface cards. Network adaptor 28 may provide communications through the use of either or both physical and wireless communications links. Program instructions and data used to practice embodiments of the present invention may be downloaded to persistent storage 18 through network adaptor 28.

I/O interface(s) 26 allows for input and output of data with other devices that may be connected to each computer system. For example, I/O interface 26 may provide a connection to external devices 30 such as a keyboard, keypad, a touch screen, and/or some other suitable input device. External devices 30 can also include portable computer readable storage media such as, for example, thumb drives, portable optical or magnetic disks, and memory cards. Software and data used to practice embodiments of the present invention can be stored on such portable computer readable storage media and can be loaded onto persistent storage 18 via I/O interface(s) 26. I/O interface(s) 26 also connect to display 32.

Display 32 provides a mechanism to display data to a user and may be, for example, a computer monitor or virtual graphical user interface.

The components described herein are identified based upon the application for which they are implemented in a specific embodiment of the invention. However, it should be appreciated that any particular component nomenclature herein is used merely for convenience, and thus the invention should not be limited to use solely in any specific application identified and/or implied by such nomenclature.

The present invention may be a system, a method and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems) and computer program products according to embodiments of the invention. It is understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality and operation of possible implementations of systems, methods, and computer program products according to various embodiments of the present invention. In this regard, each block in the flowchart or block diagrams may represent a module, segment or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
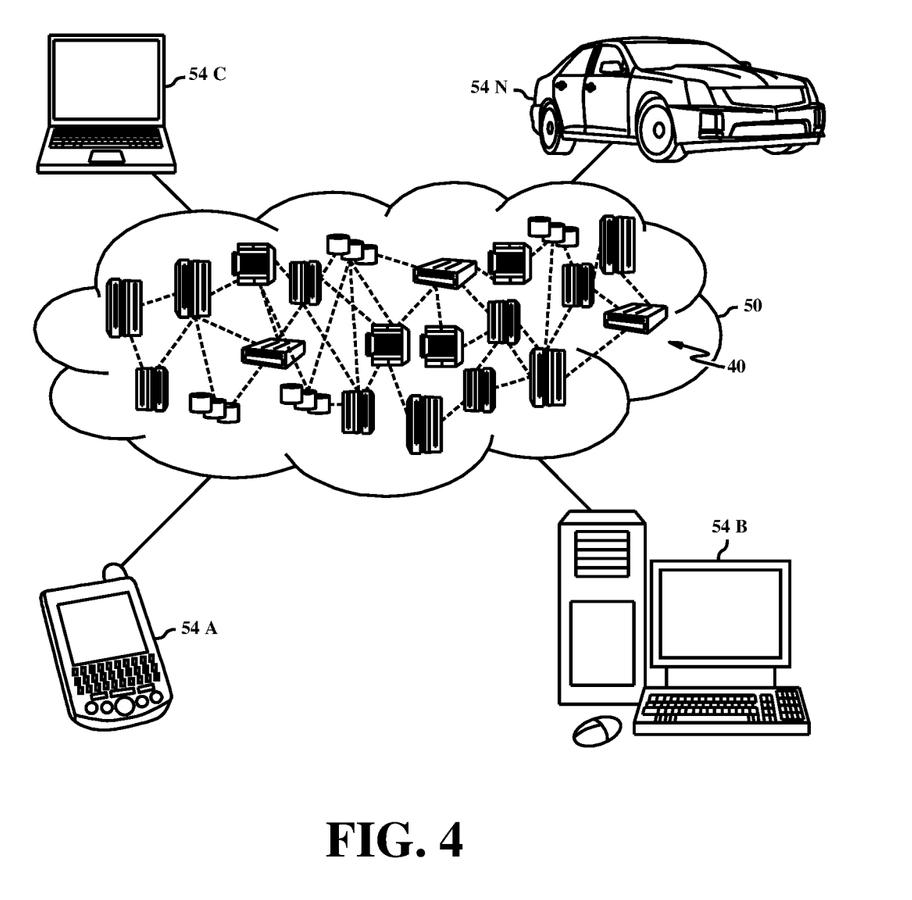
FIG. 4 is a diagram depicting a cloud computing environment, in accordance with an embodiment of the present invention.

FIG. 4 is a block diagram depicting a cloud computing environment 50 in accordance with at least one embodiment of the present invention. Cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 40 and cloud computing environment 50 can communicate with any type of computerized device over any type of network and/or network addressable connection (e.g., using a web browser).

Figure 5:
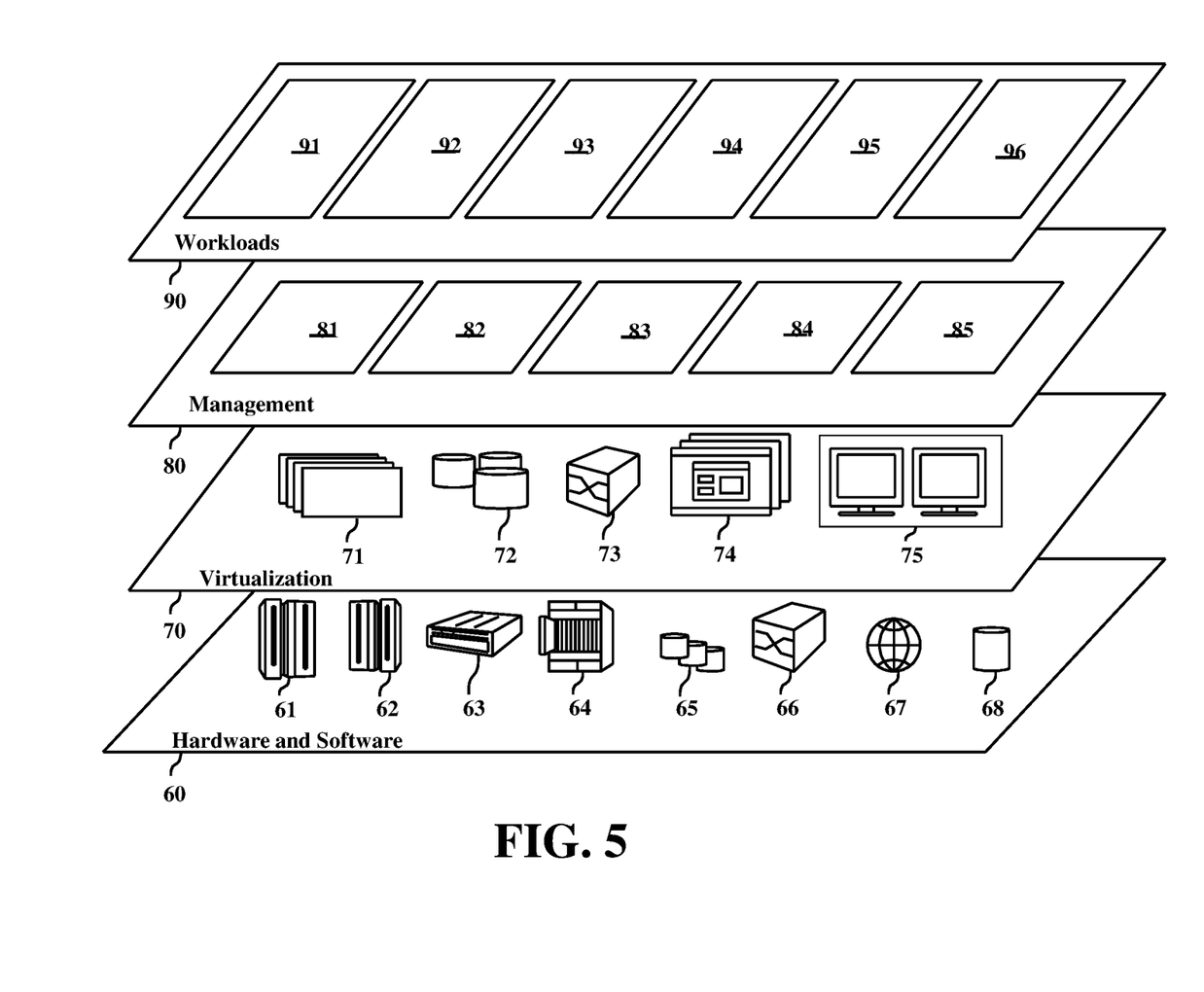
FIG. 5 is a functional block diagram depicting abstraction model layers, in accordance with an embodiment of the present invention.

FIG. 5 is a block diagram depicting a set of functional abstraction model layers provided by cloud computing environment 50 depicted in FIG. 4 in accordance with at least one embodiment of the present invention. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cloud resource pre-allocation 96.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed:

1. A computer-implemented method for pre-allocating cloud computing resources, the computer-implemented method comprising:
    accumulating a plurality of user behavior data from at least one sensor of a user's device, wherein the plurality of user behavior data is comprised of visual and audio data of the user;

identifying one or more individual behavior patterns from the plurality of user behavior data;

associating at least one cloud computing behavior request with the identified one or more individual behavior patterns;

receiving, by a processor, sensor data from the at least one sensor, wherein the sensor data is comprised of visual and audio data of the user;

identifying the user's behavior, based at least in part on the sensor data, and current time, and current date;

determining the user behavior is associated with a cloud computing resource request, wherein the cloud computing request is for an audio-visual entertainment streaming application operational on the user's device; and pre-allocating one or more cloud computing resources for the determined cloud computing resource request.

2. The computer-implemented method of claim 1, further comprising:

training a first neural network with the plurality of user behavior data, wherein the neural network recognizes individual behavioral patterns.

3. The computer-implemented method of claim 2, further comprising:

training a second neural network with the identified individual behavior patterns and the cloud resource request to predict a likelihood that a specific individual behavior pattern will result in a cloud resource request.

4. The computer-implemented method of claim 1, wherein the individual behavioral patterns are comprised of at least one or the following picking up a video gaming remote, accessing a smartphone, entering a room, sitting in on a specific piece of furniture, turning on a smart device.

5. The computer-implemented method of claim 1, wherein the individual behavioral patterns are associated with one or more users.

6. A computer system for pre-allocating cloud computing resources, the system comprising:

one or more computer processors;
one or more computer readable storage media; and
computer program instructions to:
accumulate a plurality of user behavior data from at least one sensor of a user's device, wherein the plurality of user behavior data is comprised of visual and audio data of the user;
identify one or more individual behavior patterns from the plurality of user behavior data;
associate at least one cloud computing behavior request with the identified one or more individual behavior patterns;
receive sensor data from the at least one sensor, wherein the sensor data is comprised of visual and audio data of the user;
identify the user's behavior, based at least in part on the sensor data, and current time, and current date;
determine the user behavior is associated with a cloud computing resource request, wherein the cloud computing request is for an audio-visual entertainment streaming application operational on the user's device; and
pre-allocate one or more cloud computing resources for the determined cloud computing resource request.

7. The computer system of claim 6, further comprising instructions to:

train a first neural network with the plurality of user behavior data, wherein the neural network recognizes individual behavioral patterns.

8. The computer system of claim 7, further comprising instructions to train a second neural network with the identified individual behavior patterns and the cloud resource request to predict a likelihood that a specific individual behavior pattern will result in a cloud resource request.

9. The computer system of claim 6, wherein the individual behavioral patterns are comprised of at least one or the following picking up a video gaming remote, accessing a smartphone, entering a room, sitting in on a specific piece of furniture, turning on a smart device.

10. The computer system of claim 6, wherein the individual behavioral patterns are associated with one or more users.

11. A computer program product for pre-allocating cloud computing resources, the computer program product comprising one or more computer readable storage media and program instructions stored on the one or more computer readable storage media to:

accumulate a plurality of user behavior data from at least one sensor of a user's device, wherein the plurality of user behavior data is comprised of visual and audio data of the user;
identify one or more individual behavior patterns from the plurality of user behavior data;
associate at least one cloud computing behavior request with the identified one or more individual behavior patterns;
receive sensor data from the at least one sensor, wherein the sensor data is comprised of visual and audio data of the user;
identify the user's behavior, based at least in part on the sensor data, and current time, and current date;
determine the user behavior is associated with a cloud computing resource request, wherein the cloud computing request is for an audio-visual entertainment streaming application operational on the user's device; and
pre-allocate one or more cloud computing resources for the determined cloud computing resource request.

12. The computer program product of claim 11, further comprising instructions to:

train a first neural network with the plurality of user behavior data, wherein the neural network recognizes individual behavioral patterns.

13. The computer program product of claim 12, further comprising instructions to:

train a second neural network with the identified individual behavior patterns and the cloud resource request to predict a likelihood that a specific individual behavior pattern will result in a cloud resource request.

14. The computer program product of claim 11, wherein the individual behavioral patterns are comprised of at least one or the following picking up a video gaming remote, accessing a smartphone, entering a room, sitting in on a specific piece of furniture, turning on a smart device.

* * * * *